US008157906B2

(12) United States Patent
Swiezkowski et al.

(10) Patent No.: US 8,157,906 B2
(45) Date of Patent: Apr. 17, 2012

(54) CORRUGATING ADHESIVE AND USE THEREOF

(75) Inventors: Frank Swiezkowski, Hamilton, NJ (US); Craig H. Leake, Somerset, NJ (US); Robert L. Billmers, Stockton, NJ (US); Robert Wojcik, Phillipsburg, NJ (US); Michael T. Philbin, Hopewell, NJ (US)

(73) Assignee: Henkel AG & Co. KGaA, Duesseldorf (DE)

( * ) Notice: Subject to any disclaimer, the term of this patent is extended or adjusted under 35 U.S.C. 154(b) by 271 days.

(21) Appl. No.: 12/544,803

(22) Filed: Aug. 20, 2009

(65) Prior Publication Data

US 2010/0043968 A1   Feb. 25, 2010

Related U.S. Application Data

(63) Continuation of application No. PCT/US2008/054660, filed on Feb. 22, 2008.

(60) Provisional application No. 60/891,288, filed on Feb. 23, 2007.

(51) Int. Cl.
*C09J 103/02* (2006.01)
*C09J 103/04* (2006.01)
*C09J 103/06* (2006.01)
*C09J 103/08* (2006.01)
*C09J 103/10* (2006.01)

(52) U.S. Cl. ............... 106/211.1; 106/207.3; 106/208.3

(58) Field of Classification Search ............... 106/208.3, 106/211.1, 207.3
See application file for complete search history.

(56) References Cited

U.S. PATENT DOCUMENTS

| 2,051,025 | A | | 8/1936 | Bauer |
| 3,300,360 | A | | 1/1967 | Williams et al. |
| 4,374,217 | A | | 2/1983 | Miyake et al. |
| 5,393,336 | A | * | 2/1995 | Foran et al. ............... 106/208.1 |

FOREIGN PATENT DOCUMENTS

| EP | 0533031 | 3/1993 |
| EP | 0627477 | 12/1994 |
| EP | 0832906 | 4/1998 |
| EP | 0849342 | 6/1998 |
| GB | 992213 | 5/1965 |
| WO | 9504082 | 2/1995 |
| WO | 0200804 | 1/2002 |
| WO | 0242390 | 5/2002 |

OTHER PUBLICATIONS

"Corrugating Starch Adhesives Manual", Corn Products, USA. 2006.*
Wurzburg, O.B. Modified Starches: Properties and Uses, CRC Press, Inc., Boca Raton, FL (1986).
Clyde H. Sprague, Institute of Paper Chemistry, "Development of a Cold Corrugating Process—Final Report" (May 1985).

* cited by examiner

*Primary Examiner* — David M Brunsman
(74) *Attorney, Agent, or Firm* — Sun Hee Lehmann

(57) ABSTRACT

A novel adhesive that finds use in a cold corrugating system has a 5 second tack at a temperature of 160° F. of at least 50±2 grams.

15 Claims, No Drawings

CORRUGATING ADHESIVE AND USE THEREOF

CROSS-REFERENCE TO RELATED APPLICATIONS

This application is a continuation of International Application No. PCT/US2008/054660 filed Feb. 22, 2008 which claims the benefit of U.S. Provisional Patent Application No. 60/891,288 filed Feb. 23, 2007, the contents of each of which are incorporated herein by reference.

FIELD OF THE INVENTION

The present invention relates to a corrugating adhesive used in the manufacture of corrugated board using a cold corrugating system.

BACKGROUND OF THE INVENTION

Corrugated paper board is commonly prepared by first forming a corrugated element or core by passing a cellulosic sheet between corrugating rolls forming a substantially sinusoidal or serpentine cross-section in the sheet. An adhesive is commonly applied to the tips of the thus formed sinusoidal portion called flutes and a noncorrugated or planar cellulosic liner is applied against the adhesive coated flutes of the corrugated elements as the corrugated sheet passes between a corrugating roll and a pressure roll. The resulting paper product having the corrugating medium on one side and the planar liner on another side is called a single-faced web. The single-faced element may be used as is in certain applications as a liner or buffer material within a container. More commonly adhesive is applied to the flute tips of the single-faced web and a second liner sheet is subsequently applied to the adhesive liner in a "double facer" operation. The second liner sheet is exposed to conditions of heat and pressure during its contact with the adhesive. In practice, the sheet of corrugated cardboard most frequently encountered has two plane sides placed on each side of the corrugated core. Depending on the specific strength desired, a sheet of corrugated cardboard may also be provided with a more complex structure, such as two corrugated cores and three plane surfaces, two outer ones and one inner one separating the two corrugated cores. This is referred to as double wall board.

Starch-based adhesives are most commonly used in the corrugating process due to their desirable adhesive properties, low cost and ease of preparation. The most fundamental of starch corrugating adhesives is an alkaline adhesive which is comprised of raw, ungelatinized starch suspended in an aqueous dispersion of cooked starch. The adhesive is produced by gelatinizing starch in water with sodium hydroxide (caustic soda) to yield a primary mix of gelatinized or cooked carrier, which is then slowly added to a secondary mix of raw (ungelatinized) starch, borax and water to produce the full-formulation adhesive. In conventional corrugating processes, the adhesive is applied (usually at between 25° and 55° C.) to the tips of the fluted paper medium or single-faced board, whereupon the application of heat and pressure causes the raw starch to gelatinize, resulting in an instantaneous increase in viscosity and formation of the adhesive bond. In other words, the adhesive is applied while relatively cool and then requires the application of high temperatures at the points of bonding to effect in situ gelatinization of the raw starch granules, a process that is lacking in both efficiency and economy.

While certain prior art "cold" corrugating methods have been suggested in order to eliminate the need for heating systems required for setting the adhesive, such process have not proven to be commercially viable. See, U.S. Pat. No. 3,300,360, U.S. Pat. No. 4,374,217 and Clyde H. Sprague, Institute of Paper Chemistry, "Development of a Cold Corrugating Process—Final Report" (May 1985). There continues to be a need in the art for methods and means to eliminate or at least minimize the amount of heat/heating systems that are still conventional in the corrugating arts. The current invention fulfills this need.

SUMMARY OF THE INVENTION

The invention is directed to a novel adhesive that can be used in a cold corrugating process to manufacture corrugated board without the need to apply heat following application of the adhesive to the tips of the corrugated board.

The adhesive of the invention is a waterborne adhesive comprising a starch component, a caustic component and a boron-containing component, which adhesive is characterized in having a solids content of greater than about 20% and a 5 second tack at a temperature of 160° F. (71° C.) of at least 50±2 grams. In one embodiment the adhesive has a 5 second tack at a temperature of 160° F. of at least 80 grams. In another embodiment the adhesive has a 5 second tack at a temperature of 160° F. of at least 100 grams. The starch component may desirably be a modified starch. Modified starches useful in the practice of the invention include oxidized starches.

In one embodiment the adhesive comprises water, an oxidized starch at a solids content of 25-45% and, based on the starch content, 1 to 5 wt % of a caustic such as sodium hydroxide, and 2-10 wt % of a boron-containing compound such as borax or sodium metaborate tetrahydrate. The formulated adhesive will desirably have a viscosity of between 200 and 3000 cps when applied at a temperature of 160° F.

Another embodiment of the invention is directed to a method of preparing corrugated paperboard by adhesively bonding a liner paper to protruding tips of a corrugated paper using the novel adhesive of the invention. The method of the invention comprises applying to the tips of corrugations of a corrugated paper a waterborne adhesive comprising a starch component, a caustic and a boron-containing compound, which adhesive is characterized in having a solids content of greater than about 20% and a 5 second tack at 160° F. of at least 50±2 grams, applying a liner to the adhesive coated tips of the corrugated paper and allowing the adhesive to dry in the absence of additional heat.

Still another embodiment of the invention is directed to a method of preparing a waterborne adhesive useful as a cold corrugating adhesive comprising mixing together water, a starch component, a caustic component and a viscosity-modifying component, and wherein the viscosity-modifying component is added before the caustic component. In one preferred embodiment the viscosity-modifying component is a boron-containing compound. In another preferred embodiment, the caustic component is sodium hydroxide and the boron-containing compound is sodium metaborate tetrahydrate.

The invention provides the art with a corrugating operation that runs at ambient conditions and therefore significantly reduces energy costs currently encountered with the hot process being practiced today.

DETAILED DESCRIPTION OF THE INVENTION

All documents cited herein are incorporated in their entireties by reference.

"Cold corrugating" is defined as a process wherein no additional heat, other than the heat present in the adhesive, must be applied to the board during the actual bonding of the corrugated tips to the liner board. It will be recognized and understood that other sources of heat and residual heat, for example heat used in other steps of the corrugating process such as that used for flute formation, may be present. It will also be recognized that while no additional source of heat is required to practice the process of the invention, heat may be added if desired.

The adhesive used in the practice of the invention comprises a starch component, a caustic and a boron-containing compound, and is characterized in having a solids content of greater than about 20% and a 5 second tack at a temperature of 160° F. of at least 50±2 grams.

The starch used in the practice of the invention include all starches derived from a native source, any of which may be suitable for use herein. A native starch as used herein, is one as it is found in nature. Also suitable are starches derived from a plant obtained by standard breeding techniques including crossbreeding, translocation, inversion, transformation or any other method of gene or chromosome engineering to include variations thereof. In addition, starch derived from a plant grown from artificial mutations and variations of the above generic composition, which may be produced by known standard methods of mutation breeding, are also suitable herein.

Typical sources for the starches are cereals, tubers, roots, legumes and fruits. The native source can be corn, pea, potato, sweet potato, banana, barley, wheat, rice, sago, amaranth, tapioca, arrowroot, canna, sorghum, and waxy (i.e., a starch containing at least about 95% by weight amylopectin) or high amylose (i.e., a starch containing at least about 40% by weight amylose) varieties thereof.

The starch will preferably be modified by any suitable means to lower the molecular weight of the starch in order to meet desired viscosity and solids requirements.

Physically modified starches, such as sheared starches, or thermally-inhibited starches described in the family of patents represented by WO 95/04082, are suitable for use herein. Chemically modified products are also included as the base starch and include, without limitation, those which have been crosslinked, acetylated and organically esterified, hydroxyethylated and hydroxypropylated, phosphorylated and inorganically esterified, cationic, anionic, nonionic, and zwitterionic, and succinate and substituted succinate derivatives thereof. Such modifications are known in the art, for example in *Modified Starches: Properties and Uses*, Ed. Wurzburg, CRC Press, Inc., Florida (1986). Conversion products derived from any of the starches, including fluidity or thin-boiling starches prepared by oxidation, enzyme conversion, acid hydrolysis, heat and or acid dextrinization, thermal and or sheared products are also useful.

The adhesive compositions of the invention have a solids content of greater than 20% and comprise: a starch; an alkali such as sodium, potassium, or ammonium hydroxide; a viscosity modifier, such as a boron-containing compound, stannate salt, or ammonium zirconium carbonate (AZC); and water. The starch used in the practice of the invention is a starch that has been dispersed at a temperature greater than 170° F. or that has been made cold water soluble (by any process known and practiced in the art). The formulated adhesive is held at and applied at a temperature between room temperature (70° F. (21° C.)) and 160° F. (71° C.) when used in a cold corrugating process.

The adhesive will typically be formulated to have a starch solids content of from about 25 to about 45%, and be dispersed at a temperature sufficient to produce solubles of greater than 80%.

Typical levels of caustic will range from about 0.5 to about 12 wt %, more typically from about 1 to about 8 wt %, based on the content of the starch component. Typical levels of borax or other boron-containing component will be from about 1 to about 10 wt %, more typically from about 1 to about 5 wt %, based on the content of the starch component.

It will be appreciated that other conventional additives such as but not limited to colorants, fillers, clays and the like may be incorporated into the formulated adhesives of the invention.

Formulations will have a viscosity of from about 100 to about 3000 cps, more typically between 200-1000 cps, at an application temperature of about 160° F. The formulations of the invention have a viscosity stability of at least 2 hours, more typically at least 4 hours, even more typically at least 8 hours. Formulations are considered stable if there is less than a 10% change in viscosity.

The formulated adhesives will have a 5 second tack at temperatures of 160° F. of at least 50±2 grams. In one embodiment the formulated adhesive has a 5 second tack at a temperature of 160° F. of at least 80 grams. In another embodiment the formulated adhesive has a 5 second tack at a temperature of 160° F. of at least 100 grams. Tack is determined by the method described in the following Examples which Examples are presented for purposes of illustration and not limitation.

EXAMPLES

In the examples that follow, adhesive tack was determined using the following protocol:

21 lb wet strength bag stock paper is cut into 6"×15" strips. Two of these are placed on a glass plate and clipped into place at the top. The top sheet is folded back and creased at the clip. A drawdown of adhesive is made onto the bottom sheet using a 2"×0.0015" bird applicator that has been previously heated to the temperature of the adhesive being tested. The bird applicator is drawn down from the top of the sheet to the bottom. The top sheet is then brought down on top and the two papers pressed together by rolling a 17 pound rubber coated roller over the surface two times (back and forth).

The top edge of the bottom sheet of this construction is clipped to a Spring Scale in which a pull-down spring scale is suspended about 2.5 to 3.0 feet above the bench top surface using a ring stand. The actual testing end of the spring scale, which has a #40 binder clip attached to it, is used to grip the bag stock during the tack evaluation. The scale range used (0-250 grams, 0-500 grams, or 0-2000 grams) will be dependent on the tack level of the adhesive being tested. The unattached sheet is pulled down vertically (180° peel) at a rate of about 0.5" per second in order to separate the two plies. A timer is started as soon as the paper is attached to the clip. As one pulls on the scale, which measures in grams, the tack is read at 5, 10, and 15 seconds. Time to achieve fiber tear is also noted. Tack level is defined as the force measurement minus the weight of the base substrates. The bag stock used was characterized as having a 60 second cobb of 41.5 g/m² as determined by TAPPI procedure T 441 OM-90 and gurley porosity of 4.0 sec. per 100 ml. per 6.4 cm² as defined by TAPPI procedure T 460 OM-88.

Example 1

An 8000 ml beaker containing 1500 parts water was placed in a constant temperature bath maintained at 40° C. 1000 parts corn starch was added under an agitation of 350 rpm. Desired parts of sodium hypochlorite solution to achieve a given percent sodium hypochlorite (NaOCl) treatment on dry starch was added using a pump. After all of the sodium hypochlorite was added, the pH was adjusted to 10.5 using 3% sodium hydroxide. The pH was monitored for an additional hour and re-adjusted to pH=10.5 as necessary. After 18 hours (starting from sodium hypochlorite addition completion), any excess sodium hypochlorite was destroyed using 10% sodium bisulfite. The pH was then adjusted to 6.5 using a 1 part concentrated HCl/3 parts water solution. It was then filtered and the cake washed twice using 1500 parts water. The cake was then air dried.

Example 2

The starch of Example 1 was slurried in room temperature water and then heated to 160° F. at which time sodium hydroxide was introduced. This mixture was further heated to 190° F. and held for 5 to 10 minutes at which time the boron-containing compound was added. The adhesive was then held for an additional 5 minutes. The starch cook was then cooled to 160° F. and a Brookfield viscosity measurement taken. Performance tests were then conducted on the finished adhesive.

Example 3

Adhesive sample 1 was formulated using an acid hydrolyzed starch prepared as follows:
4 parts corn starch was slurried in 5 parts water and heated to approximately 57° C. A total of 2% sulfuric acid, based on starch weight, was added as a 25% solution, with good agitation and allowed to react for 20 hours. The reaction was then partially neutralized to a pH of approximately 5 with sodium carbonate and then neutralized to a final pH of 5.5-6.0 using a 3% sodium hydroxide solution. The starch sample was dewatered by filtration and then air dried to a final moisture of 11.4. Final viscosity was approximately a 71 Water Fluidity (WF). WF was determined using the procedure set forth below.

Adhesive sample 2 was formulated using an acid hydrolyzed and propylene oxide treated starch prepared as follows:
4 parts corn starch was slurried in 5 parts water. 1.2% sulfuric acid, based on starch weight, was added. The reaction was run at 54° C. for a duration of 14 hours. The pH of the slurry was then raised to 12.0 using sodium hydroxide and then reacted with 6.8% propylene oxide for 15 hours. The pH was adjusted to 5.5-6.0 using a dilute (10%) sulfuric acid solution. The starch sample was dewatered by filtration and then air dried to a final moisture of 12.3. This provided a starch sample having a bound propylene oxide of 5.1%.

Adhesive sample 3 was formulated using an acid hydrolyzed, propylene oxide treated and sodium hypochlorite treated starch prepared as follows:
4 parts corn starch was slurried in 5 parts water. The starch was initially hydrolyzed and treated with propylene oxide using the procedure described for starch used in the preparation of adhesive sample 2 above. The starch sample had a WF viscosity of 71 and a bound propylene oxide level of 5.3%. The sample was further modified by treating with 0.8% sodium hypochlorite, based on starch, for 2 hours @ 40° C. and pH=7.3. The starch sample was neutralized using dilute (10%) sulfuric acid to a pH of 5.5-6.0 and then filtered and air dried.

Water Fluidity (WF) was measured using the following procedure: 13.2 grams anhydrous starch was brought to 115 grams total in a standard copper WF cup (available from Thomas Scientific, Philadelphia, Pa.) using distilled water. The dispersed sample was placed in a 10° C. bath where it was immediately stirred at approximately 160 cycles per minute, using a thermometer, until it reached 90° C. After reaching 90° C., the cup was covered with a bored No. 11 rubber stopper. Total cook time was 30 minutes, starting from when sample was initially put in 100° C. bath. After 30 minute cook time, sample was removed from bath and brought back to original weight with hot distilled water. With the sample at approximately 79-83° C., it was then evaluated for viscosity using a Stormer Viscometer (available from Thomas Scientific). Using this equipment, a reading of 15 seconds for 100 revolutions gave a corresponding value of 71 WF.

Adhesive samples 1-3, comprising the starch prepared as described above, were made using procedures described in Example 2, and contained 0.5 parts of dry sodium hydroxide and 1.0 parts of sodium metaborate tetrahydrate. Brookfield viscosity measurement was taken. Performance tests were then conducted on the finished adhesive. Results are shown in Table 1.

TABLE 1

| Adhesive | Percent Anhydrous Starch Solids | 20 rpm Brookfield Viscosity at 160° F. | 5 Second Tack (grams) |
| --- | --- | --- | --- |
| Sample 1 | 25.0 | 900 | 58 |
| Sample 2 | 26.5 | 270 | 49 |
| Sample 3 | 25.0 | 425 | 55 |

Example 4

Various adhesives were prepared in accordance with the procedure described in Example 2. The samples had a viscosity between 200 to 400 cps (Table 2) or between 1700 and 2300 cps (Table 3). All adhesive samples comprised starch prepared as described in Example 1 and contained 0.5 parts of dry sodium hydroxide and 1.0 parts of sodium metaborate tetrahydrate.

TABLE 2

| Adhesive | NaOCl Treatment Level of the Starch | Parts Water | Parts Anhydrous Starch | 20 rpm Brookfield Viscosity at 160° F. | 5 Second Tack (grams) |
| --- | --- | --- | --- | --- | --- |
| Sample 4 | 1.8 | 85.5 | 13 | 340 | 15 |
| Sample 5 | 3.75 | 73.5 | 25 | 296 | 56 |
| Sample 6 | 4.35 | 72 | 26.5 | 274 | 52 |
| Sample 7 | 4.95 | 70.5 | 28 | 290 | 50 |
| Sample 8 | 5.5 | 68.5 | 30 | 300 | 65 |
| Sample 9 | 7.5 | 66.5 | 32 | 230 | 75 |

TABLE 3

| Adhesive | NaOCl Treatment Level of the Starch | Parts Water | Parts Anhydrous Starch | 20 rpm Brookfield Viscosity at 160° F. | 5 Second Tack (grams) |
| --- | --- | --- | --- | --- | --- |
| Sample 10 | 2.25 | 76.5 | 22 | 1950 | 30 |
| Sample 11 | 4.35 | 66 | 32.5 | 2200 | 105 |
| Sample 12 | 7.5 | 58.5 | 40 | 1700 | 200 |

Example 5

Starches prepared as described in Example 1 were slurried in room temperature water and heated to 190-195° F. at which time the boron-containing compound was added. After 10 to about 15 additional minutes, caustic was added and thoroughly mixed in. The starch was then cooled to 160° F. and a Brookfield viscosity measurement was taken. Performance tests were then conducted on the finished adhesive.

Example 6

Adhesive samples 13-18 were prepared as described in Example 5, except no sodium hydroxide was added to sample 13 or 15 and no boron containing compound was added to sample 13 or 16. All samples contained 25 parts of anhydrous starch prepared as described in Example 1. The effects of sodium hydroxide/boron-containing compound levels on tack is shown in Table 4.

TABLE 4

| Adhesive | Percent Dry Sodium Hydroxide on Anhydrous Starch | Percent 5 mole Sodium Borate Equivalents on Anhydrous Starch | 20 rpm Brookfield Viscosity at 160° F. | 5 Second Tack (grams) |
|---|---|---|---|---|
| Sample 13 | — | — | 270 | 0 |
| Sample 14 | 0.24 | 2.02 | 684 | 13 |
| Sample 15 | — | 5.00 | 486 | 7 |
| Sample 16 | 1.94 | — | 92 | 0 |
| Sample 17 | 2.90 | 0.30 | 132 | 6 |
| Sample 18 | 2.90 | 3.03 | 268 | 55 |

Example 7

Comparative adhesive samples A and B were prepared in accordance with the teachings of Examples I and II of U.S. Pat. No. 3,300,360.

Comparative adhesive sample A was prepared from a white corn dextrin having a solubility in water at about 77° F., of from 5 to 15%, by weight; a reducing sugar content of from 1 to 3.5%, by weight; and an Anhydrous Fluidity Value (ABF) of between about 3.8 to 4.2. 32 parts of this starch was slurried in 64.8 parts water. 3.2 parts 5 mole sodium borate was added and the mixture heated to 190° F. The sample was mixed for 10 minutes and then analyzed for Brookfield viscosity and performance.

Comparative adhesive sample B was prepared from a white corn dextrin having a solubility in water at about 77° F., of less than 5%, by weight; a reducing sugar content of from 0-2%, by weight; and an Anhydrous Fluidity Value (ABF) of between about 5.0-6.6. 32 parts of this starch was slurried in 66.4 parts water. The sample was heated to 160° F. where 1.6 parts 6.25N sodium hydroxide solution was added and the mixture heated to 190° F. The sample was mixed for 10 minutes and then analyzed for Brookfield viscosity and performance.

Results are shown in Table 5 below.

Example 8

Comparative adhesive samples C and D were prepared in accordance with the disclosure of Clyde H. Sprague, Institute of Paper Chemistry, "Development of a Cold Corrugating Process—Final Report" (May 1985).

Comparative adhesive sample C was prepared using 31 parts anhydrous sample of a standard dent corn (approximately 28% amylose) slurried with 63.85 parts water. 0.06 parts ammonium persulfate, as well as 0.09 parts boric acid were added and mixed in. The contents were then passed through a pressurized cooker such that the cooking chamber temperature was between 275-285° F. The discharged material was then held at 190° F. in a bath where sodium hydroxide (6.25N solution) was added until pH=10.5 was reached. The starch cook was then cooled to 160° F. and a Brookfield viscosity measurement was taken. Performance tests were then conducted on the finished adhesive. Solids of the final adhesive, as measured by refractometer, was 25.2%.

Comparative adhesive sample D was prepared using 36 parts anhydrous sample of a standard dent corn (approximately 28% amylose) slurried with 63.77 parts water. 0.12 parts ammonium persulfate, as well as 0.11 parts boric acid were added and mixed in. The contents were then passed through a pressurized cooker such that the cooking chamber temperature was between 275-285° F. The discharged material was then held at 190° F. in a bath where sodium hydroxide (6.25N solution) was added until pH=10.5 was reached. The starch cook was then cooled to 160° F. and a Brookfield viscosity measurement was taken. Performance tests were then conducted on the finished adhesive. Solids of the final adhesive as measured by refractometer was 30.3%.

Results are shown in Table 5 below.

TABLE 5

| Adhesive | 20 rpm Brookfield Viscosity at 160° F. | 5 Second Tack (grams) |
|---|---|---|
| Comparative Sample A | 264 | 1 |
| Comparative Sample B | 220 | 6 |
| Comparative Sample C (25% solids) | 700 | 3 |
| Comparative Sample D (30% solids) | 460 | 3 |

Example 9

An adhesive preparation was made using the boiling water bath method described in Example 2. 27 parts oxidized starch was slurried in 69.67 parts room temperature water and then heated to 160° F. at which time 2.37 parts 6.25N sodium hydroxide solution was introduced. This was further heated to 190° F. and held for 10 minutes at which time the 0.96 parts sodium metaborate tetrahydrate was added. The adhesive was then held for an additional 5 minutes. The starch cook was then cooled to 160° F. and a Brookfield viscosity measurement taken. A 7000 gram sample was then evaluated on a pilot corrugator. Results are shown in Table 6.

Example 10

This example illustrates another adhesive preparation using the starch of Example 7, (comparative sample A). 32 parts of starch were slurried in 64.8 parts water. 3.2 parts 5 mole sodium borate was added and the mixture heated to 190° F. The sample was mixed for 10 minutes and then analyzed for Brookfield viscosity and performance on a pilot corrugator. A 7000 gram sample was then evaluated on a pilot corrugator. Results are shown in Table 6.

Example 11

This example illustrates the evaluation of running speed on a pilot corrugator. The adhesives of Examples 9 and 10 (Comparative Sample A) were formulated and analyzed for maximum speed. Pressure roll gap and pressure were set at 0.003" and 100 psi respectively. Settings used were to ensure failure of example 10 at less than 100 fpm. Singleface bonds were made using 42 lb wet strength liner and 26 lb wet strength medium paper components. All rolls and preheaters were left at ambient temperature (72° F.). Slight steam was used during the fluting process. Application was controlled using the same parameter in every case. Top speed was defined as the point where the medium and liner delaminated. Top speed capability of the pilot unit was 450 fpm. Performance Data is shown in Table 6.

TABLE 6

| Adhesive | Top Running Speed on Pilot Corrugator | 5 second Tack (grams) |
|---|---|---|
| Comparative Sample A | 50 fpm | 1 |
| Example 9 | >450 fpm | 55 |

Example 12

An adhesive preparation was made using the boiling water bath method described in Example 2. 27.95 parts of an oxidized high amylose starch (approximately 55% amylose) was slurried in 62.20 parts room temperature water and then heated to 120° F. at which time 8.54 parts 6.25N sodium hydroxide solution was introduced. This was further heated to 180° F. at which time the 1.31 parts sodium metaborate tetrahydrate was added. The adhesive was then held for an additional 10 minutes. The starch cook was then cooled to 160° F. and a Brookfield viscosity measurement taken.

The five second tack of this adhesive, as determined by the protocol described above, was greater that than 300 grams.

Example 13

Comparative Examples E and F were prepared in accordance with the Example 1 of U.S. Pat. No. 4,374,217.

Comparative Example E was prepared by suspending sixty parts by weight of high amylose corn starch having an amylose content of 70%, 35 parts by weight of ordinary corn starch, and 5 parts by weight of waxy corn starch in 186 parts by weight of water. Added into the suspension were 2 parts by weight of sodium persulfate, 0.5 part by weight of sodium sulfite, 2 parts by weight of boric acid and 1 part by weight of sodium hydroxide. The suspension was cooked at 90° C. 50% by weight aqueous solution of sodium hydroxide was then added into the paste to adjust the pH value to 9.0. Water was then added to obtain a workable viscosity at 160° F. Final solids content was 24.0%.

Comparative Example F was prepared by suspending eighty parts by weight of high amylose corn starch having an amylose content of 70%, 10 parts by weight of ordinary corn starch, and 10 parts by weight of waxy corn starch were suspended in 186 parts by weight of water. Added into the suspension were 2 parts by weight of sodium persulfate, 0.5 part by weight of sodium sulfite, 2 parts by weight of boric acid and 1 part by weight of sodium hydroxide. The suspension was cooked at 90° C. 50% by weight aqueous solution of sodium hydroxide was then added into the paste to adjust the pH value to 9.0. Water was then added to obtain a workable viscosity at 160° F. Final solids content was 21.7%.

Viscosity stability was analyzed as described in Example 14. The results are shown in Table 7 below.

Example 14

This example illustrates the procedure for analyzing viscosity stability of the finished adhesive. After formulating and initial viscosity measurements (at 160° F.), a 500 gram aliquot was placed in a glass jar and sealed with tape. The jar was placed in an oven set at 160° F. After two hours, the sample was re-evaluated for Brookfield viscosity at 160° F.

TABLE 7

| | 20 rpm Brookfield Viscosity at 160° F. | |
|---|---|---|
| Adhesive | Initial | 2 Hours Old |
| Example 9 | 430 cps | 424 cps |
| Example 12 | 250 cps | 272 cps |
| Comparative Sample C | 450 cps | 46,000 cps |
| Comparative Sample E | 4,950 cps | 15,000 cps |
| Comparative Sample F | 5,000 cps | 12,100 cps |

Even after seven days, the viscosity of the adhesive sample of Example 9 was found to be stable.

Example 15

The adhesive sample of Example 9 was evaluated for tack and Brookfield viscosity at 160° F., 135° F., and 105° F. The results are shown in Table 8.

TABLE 8

| Adhesive Temperature (° F.) | 5 second Tack (grams) |
|---|---|
| 160 | 61 |
| 135 | 67 |
| 105 | 61 |

Example 16

The starch used in the following adhesive samples was described in the preparation of sample 6 (4.35% sodium hypochlorite). The adhesive was prepared by slurrying 35 parts anhydrous starch in water and heated to approximately 190° F. (using steam injection). Adhesive sample 19 had 0.96 parts (based on initial slurry composition) sodium metaborate tetrahydrate added first. After 10 minute mix, 0.6 parts dry sodium hydroxide was added. It was then mixed for 5 additional minutes. Adhesive sample 20 had 0.6 parts (based on initial slurry composition) sodium hydroxide added first. After 10 minute mix, 0.96 parts sodium meta-borate tetrahydrate was added. The adhesive was then mixed for 5 additional minutes. Final solids in both cases was 31.0-31.5%. The adhesive samples were evaluated for tack and Brookfield viscosity at 160° F. The results are shown in Table 9.

TABLE 9

| Adhesive | 20 rpm Brookfield Viscosity @ 160° F. | 5 Second Tack (grams) |
|---|---|---|
| Sample 19 | 300 | 82 |
| Sample 20 | 250 | 55 |

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. A waterborne adhesive comprising:
   a modified starch component which is prepared by dispersing at a temperature greater than 170° F. or that has been made cold water soluble,
   a caustic component and
   a viscosity-modifying component,
   wherein adhesive is characterized in having a solids content of greater than about 20% and a 5 second tack at a temperature of 160° F. of at least 48 grams.

2. The adhesive of claim 1 which has a 5 second tack of at least 80 grams.

3. The adhesive of claim 2 which has a 5 second tack of at least 100 grams.

4. The adhesive of claim 1 wherein the viscosity-modifying component is a boron-containing compound.

5. The adhesive of claim 1 comprising
   water,
   an oxidized high amylose starch at a solids content of 25-45%,
   0.5 to 12 wt % of a sodium hydroxide, based on the starch content, and
   1 to 10 wt % of a sodium metaborate tetrahydrate, based on the starch content.

6. The adhesive of claim 1 which has a viscosity of between 100 and 3000 cps when applied at a temperature of 160° F.

7. A method of preparing corrugated paperboard by adhesively bonding a liner paper to protruding tips of a corrugated paper, the method comprising applying at tips of corrugations of a corrugated paper a waterborne adhesive of claim 1 at an application temperature of about 160° F. applying a liner to the adhesive coated tips of the corrugated paper and allowing the adhesive to dry in the absence of additional heat.

8. The method of claim 7 wherein the adhesive has a viscosity of between 200 and 3000 cps when applied at a temperature of 160° F.

9. A method of preparing corrugated paperboard of claim 7 wherein the adhesive comprises water, an oxidized high amylose starch at a solids content of 25-45%, 0.5 to 12 wt % of a sodium hydroxide, based on the starch content, and 1 to 10 wt % of a sodium metaborate tetrahydrate, based on the starch content.

10. A method of preparing the adhesive of claim 1 comprising mixing together water, the starch component, the caustic component and the viscosity-modifying component, and wherein the viscosity-modifying component is added before the caustic component.

11. The method of claim 10 wherein the viscosity-modifying component is a boron-containing compound.

12. The method of claim 11 wherein the caustic component is sodium hydroxide and the boron-containing compound is sodium metaborate tetrahydrate.

13. The method of preparing the adhesive of claim 10 comprising wherein the adhesive comprises water, an oxidized high amylose starch at a solids content of 25-45%, 0.5 to 12 wt % of a sodium hydroxide, based on the starch content, and 1 to 10 wt % of a sodium metaborate tetrahydrate, based on the starch content.

14. The adhesive of claim 1 wherein the modified starch is selected from the group consisting of sheared starch, thermally-inhibited starch, crosslinked starch, acetylated starch, organically esterified starch, hydroxyethylated starch, hydroxypropylated starch, phosphorylated starch, inorganically esterified starch, catonic starch, anionic starch, nonionic starch, zwitterionic starch, succinated starch, substituted succinated starch, oxidized starch, enzyme converted starch, acid hydrolyzed starch, heat dextrinized starch, acid dextrinized starch, and mixtures thereof.

15. A waterborne adhesive consisting essentially of:
   a modified starch which is prepared by dispersing at a temperature greater than 170° F. or that has been made cold water soluble,
   a caustic component and
   a viscosity-modifying component,
   wherein the adhesive is characterized in having a solids content of greater than about 20% and a 5 second tack at a temperature of 160° F. of at least 48 grams.

* * * * *